(12) United States Patent
Massarotti et al.

(10) Patent No.: US 9,250,675 B2
(45) Date of Patent: Feb. 2, 2016

(54) POWER LOSS MITIGATION

(71) Applicant: Seagate Technology LLC, Cupertino, CA (US)

(72) Inventors: Christopher Anthony Massarotti, Berthoud, CO (US); Philip Lee Jurey, Longmont, CO (US)

(73) Assignee: SEAGATE TECHNOLOGY LLC, Cupertion, CA (US)

( * ) Notice: Subject to any disclaimer, the term of this patent is extended or adjusted under 35 U.S.C. 154(b) by 123 days.

(21) Appl. No.: 14/107,484

(22) Filed: Dec. 16, 2013

(65) Prior Publication Data
US 2015/0169023 A1 Jun. 18, 2015

(51) Int. Cl.
*G06F 11/00* (2006.01)
*G06F 1/30* (2006.01)
*G06F 1/26* (2006.01)
*G06F 11/20* (2006.01)

(52) U.S. Cl.
CPC *G06F 1/30* (2013.01); *G06F 1/266* (2013.01); *G06F 11/2015* (2013.01)

(58) Field of Classification Search
CPC ... G06F 11/2015; G06F 1/30; G06F 11/1441; G06F 1/263
See application file for complete search history.

(56) References Cited

U.S. PATENT DOCUMENTS

| | | | |
|---|---|---|---|
| 7,107,480 B1 * | 9/2006 | Moshayedi | G06F 11/1441 714/2 |
| 7,269,755 B2 * | 9/2007 | Moshayedi | G06F 11/1441 714/2 |
| 7,350,088 B2 * | 3/2008 | Allison et al. | 713/300 |
| 7,395,452 B2 * | 7/2008 | Nicholson et al. | 714/22 |
| 7,409,590 B2 * | 8/2008 | Moshayedi | G06F 11/1441 714/20 |
| 8,566,639 B2 * | 10/2013 | Moshayedi et al. | 714/14 |
| 8,707,095 B2 * | 4/2014 | Grimshaw | 714/14 |
| 8,868,957 B2 * | 10/2014 | Davis et al. | 713/340 |
| 2010/0332897 A1 * | 12/2010 | Wilson | 714/14 |

\* cited by examiner

*Primary Examiner* — Amine Riad
(74) *Attorney, Agent, or Firm* — HolzerIPLaw, PC

(57) ABSTRACT

An implementation of a system disclosed herein provides a method comprising detecting a power loss to an apparatus, isolating the apparatus from a power supply, notifying the apparatus of the power loss, and extending operation of the apparatus for a predetermined time period using a charge reservoir.

18 Claims, 11 Drawing Sheets

POWER LOSS MITIGATION

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations and implementations as further illustrated in the accompanying drawings and defined in the appended claims.

An implementation of a system disclosed herein provides a method comprising detecting a power loss to an apparatus, isolating the apparatus from a power supply, notifying the apparatus of the power loss, and extending operation of the apparatus for a predetermined time period using a charge reservoir.

These and various other features and advantages will be apparent from a reading of the following detailed description.

BRIEF DESCRIPTIONS OF THE DRAWINGS

Figure 8:
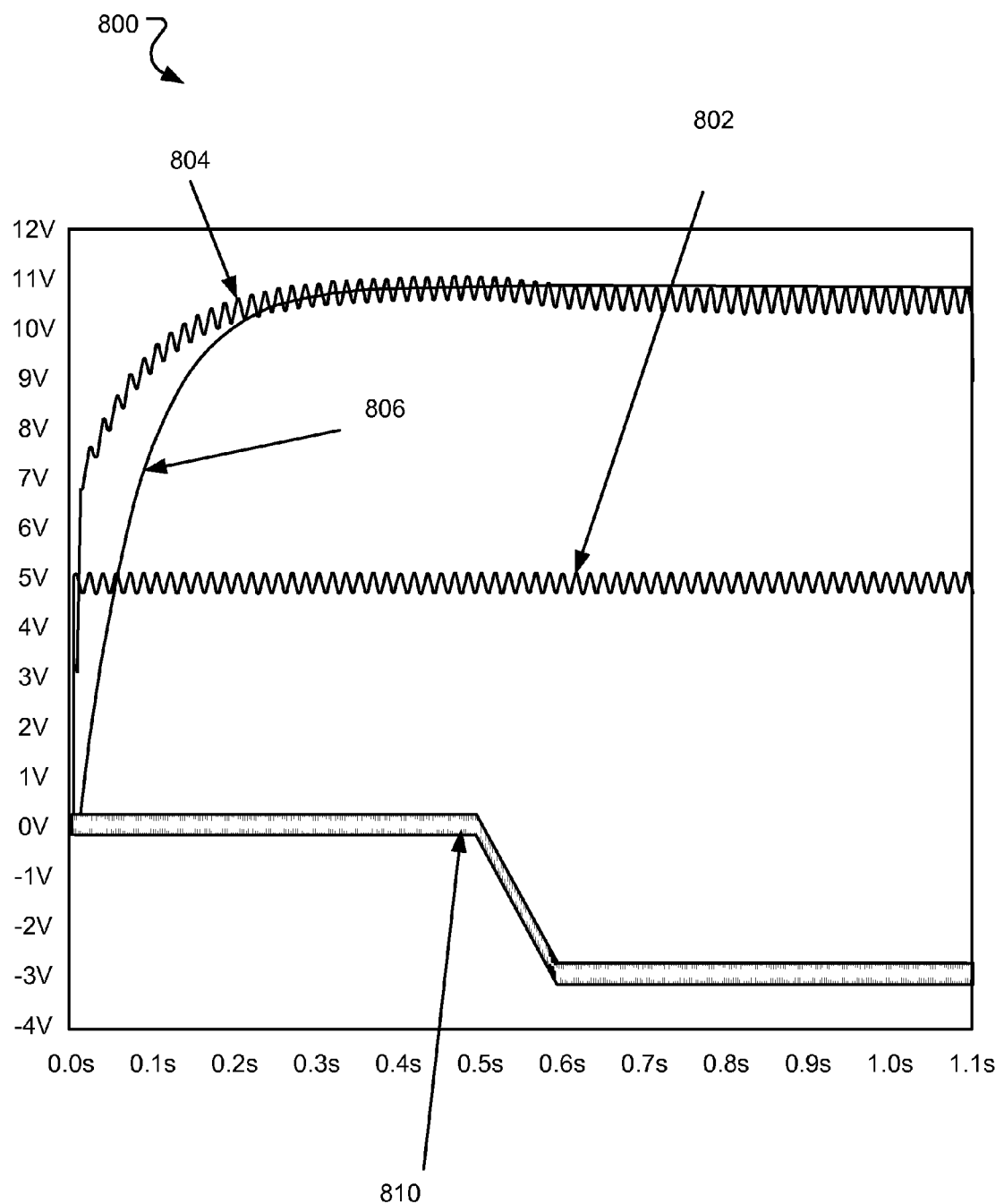
Figure 9:
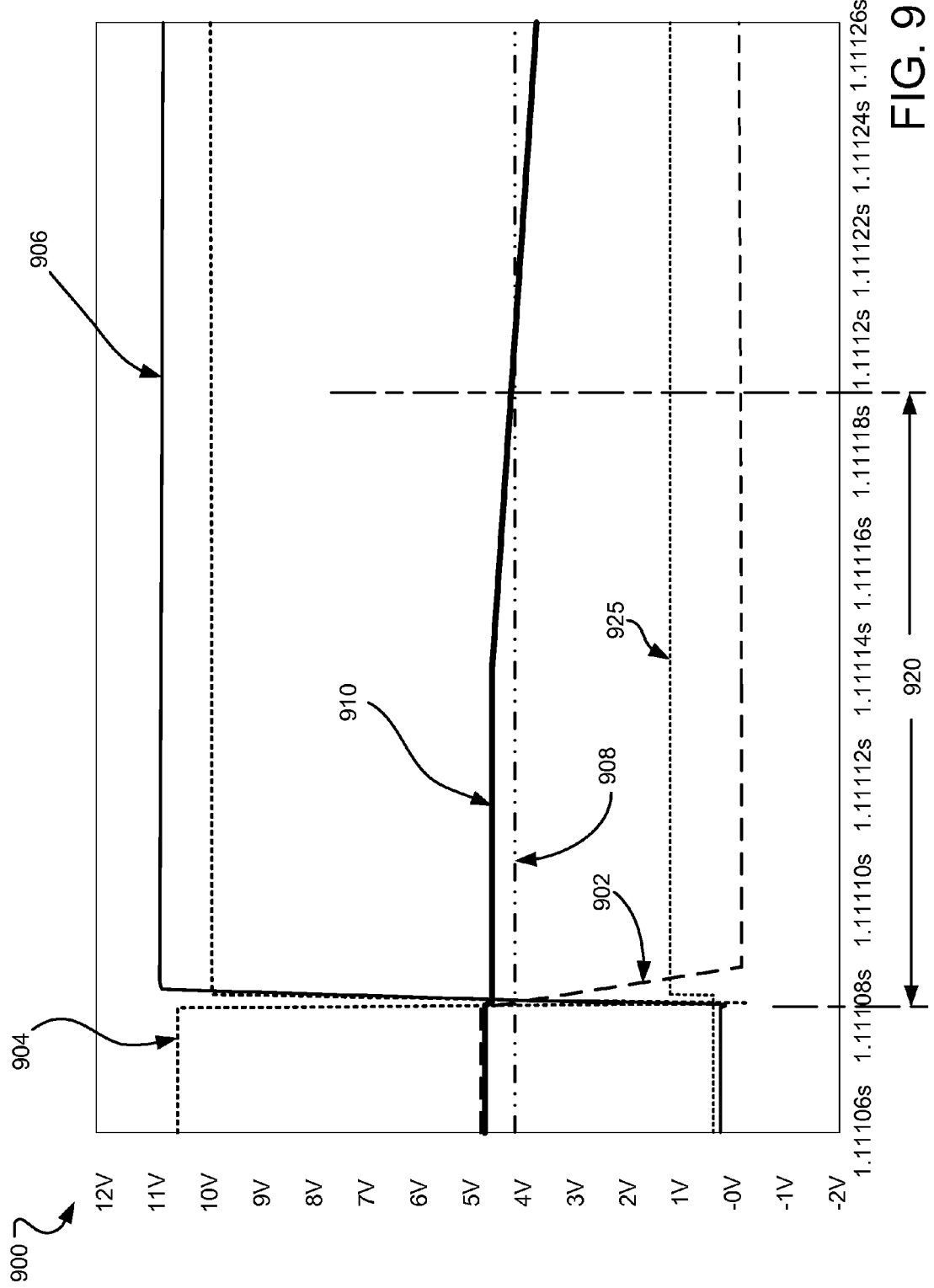
Figure 10:
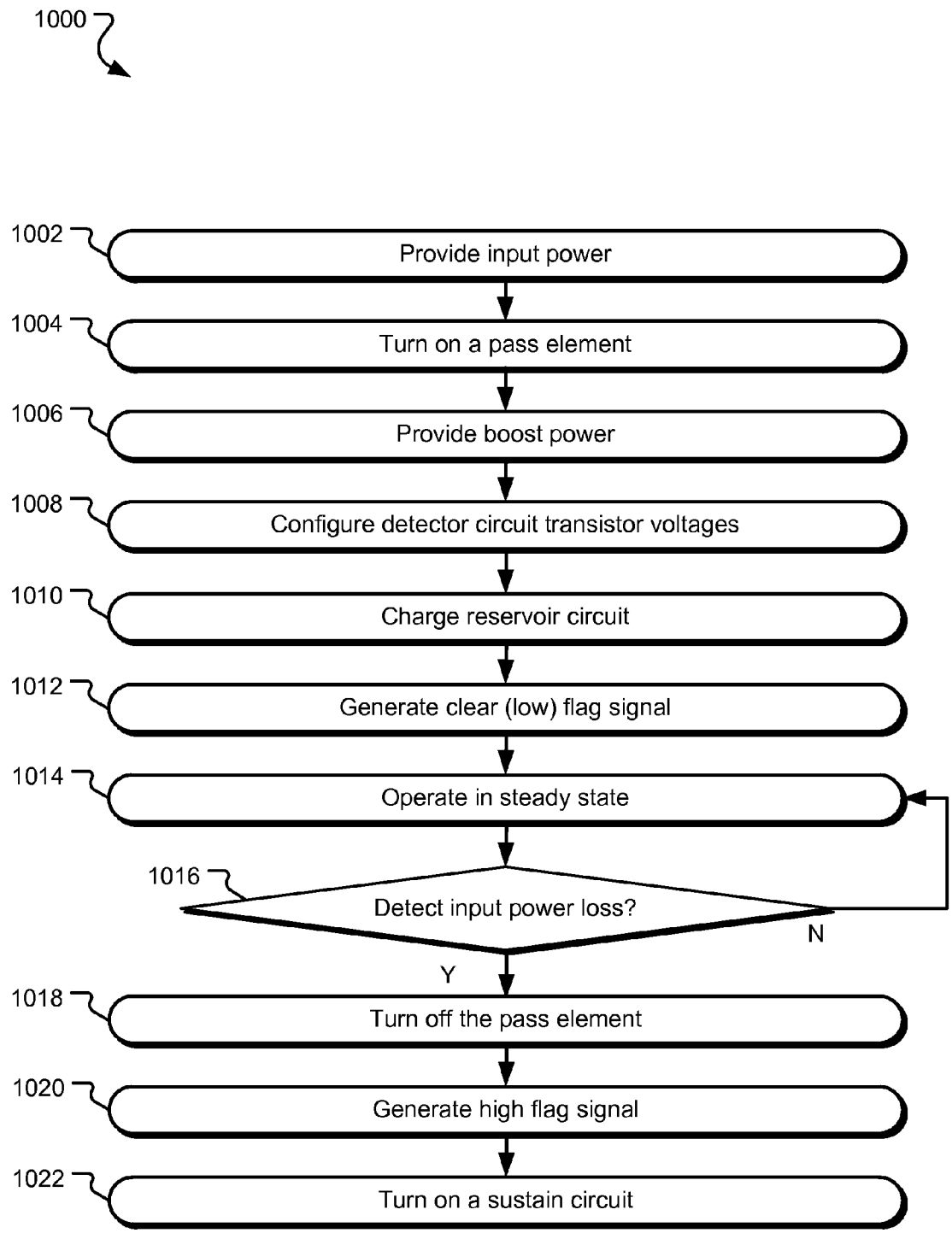

FIG. 8 illustrates an alternate example graph of voltage and current levels at various points on the power loss mitigation apparatus disclosed herein FIG. 9 illustrates an alternate example graph of voltage and current levels at various points on the power loss mitigation apparatus disclosed herein FIG. 10 illustrates example flowchart including operations of the power loss mitigation apparatus disclosed herein.

Figure 11:
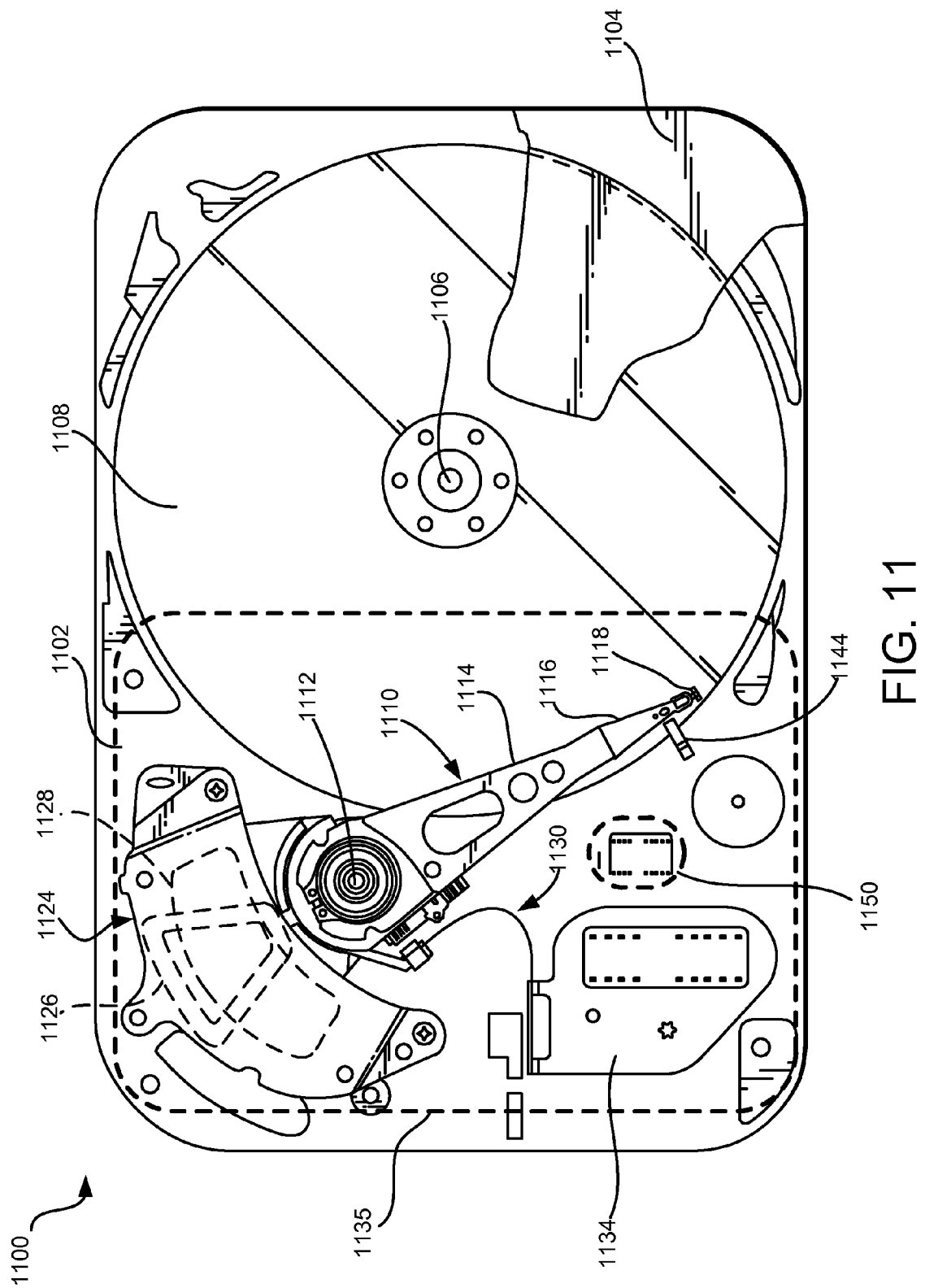

FIG. 11 illustrates example functional components of a storage device using the power loss mitigation apparatus disclosed herein.

DETAILED DESCRIPTIONS

Implementations of the power loss mitigation apparatus described herein are disclosed herein in the context of a storage device, however, the power loss mitigation apparatus may also be employed with other devices.

When a disc drive circuit loses power, a disc drive processor needs to be able to save the current work in progress on the disc. For example, the current work in progress may be stored temporarily in a serial flash drive or other non-volatile cache (NVC) storage unit that can be accessed at a later time to retrieve the information. In order to save the information the system needs to collect all the information and to physically write the information to the NVC storage space. Such gathering of information and writing it to the NVC storage takes time.

If a customer turns off the power supply to a disc drive, a power loss detection circuit on the disc drive detects the power loss and notifies the processor on the disc drive of the power loss. For example, the power loss detection circuitry generates an interrupt that is sent to the disc drive processor. In response, the processor performs a number of house keeping operations, such as collecting work-in-progress data, compressing the work-in-progress data, and writing the compressed work-in-progress data to an NVC storage unit. The functions performed from the moment that the power supply loss is detected to the moment where the operation of storing the data on the NVC is completed take some time. It is necessary that the various components responsible for successful completion of these operations have sufficient power during this process. For example, it is necessary that the disc drive processor power supply, the NVC power supply, etc., is sufficient during such house keeping operations.

This may be particularly problematic in case of a rude power loss (due to a breakage of the disc drive, short circuit in the power supply, etc.). For example, if the disc drive receives a write command and before the write command is completed, if the disc drive looses power, the data for the write command may be lost if the data for the write command is not properly saved in the NVC storage. Furthermore, with 4K sectors and the disc drive performing read-modify-write (RMW) operations (512 Byte emulation), this problem is further aggravated as the lost data may be data not just related to the current write command, but it may also include data that was written a long time ago and modified during the current RMW operation.

A system disclosed herein provides a power loss mitigation apparatus for a disc drive circuit to avoid losing work-in-progress in response to such rude power loss. Specifically, an implementation of the power loss mitigation apparatus allows a disc drive to reduce torn writes as a result of sudden or unexpected power loss. The power loss mitigation apparatus includes a detector component configured to detect a power loss event, an isolator circuit configured to isolate the apparatus from the power supply, a flag generator configured to generate a flag in response to the power loss, and a sustain circuit configured to sustain operation of the apparatus for a predetermined time period using a charge reservoir.

Figure 1:
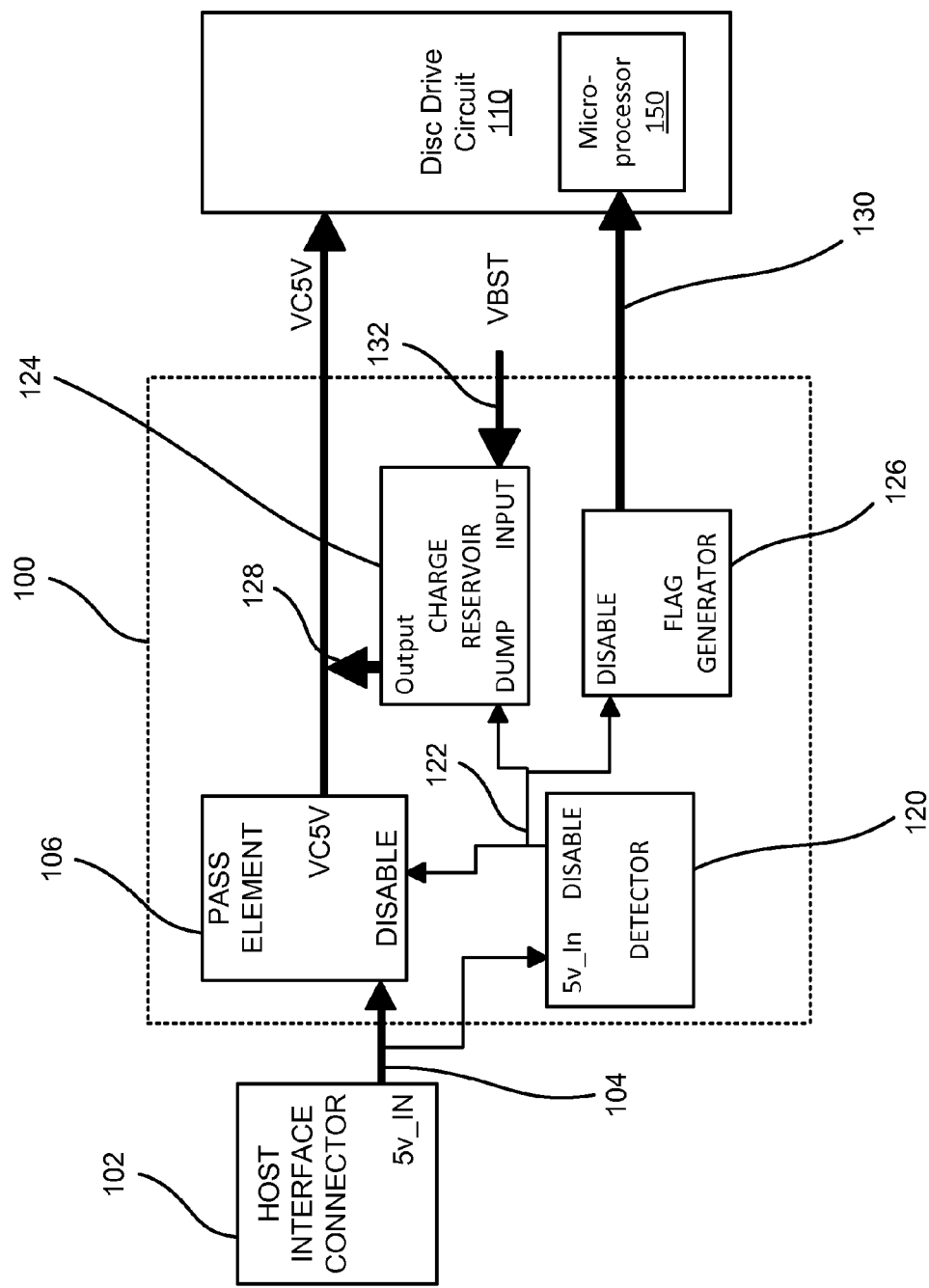
FIG. 1 illustrates example functional components of a power loss mitigation apparatus disclosed herein.

FIG. 1 illustrates example functional components of a power loss mitigation apparatus 100. The power loss mitigation circuit is configured to receive power from a host, such as a computer, via a host interface connector 102. For example, the host interface connector 102 may provide a five(5) volt input 104 to the power loss mitigation apparatus 100. The input 104 is passed via a pass element 106 to a disc drive circuit 110. The pass element 106 also operates as an isolator that can isolate the host interface connector 102 from the disc drive circuit 110. While the power loss mitigation apparatus 100 is illustrated as operating with the disc drive circuit 110, in alternative implementations, the power loss mitigation apparatus 100 may also be used together with other circuits, systems, etc.

A detector 120 also receives the voltage input 104 and monitors the voltage input for sudden power loss on the host interface connector 102. In one implementation, the detector 120 is implemented to detect a change in AC component of the voltage input 104 and a change in the DC component of the voltage input 104 to detect a power loss on the host interface connector 102. For example, the detector 120 may be configured to generate an output signal if the AC ripple at the input 104 exceeds by more than twice the allowed maximum ripple as per the specification of the host interface connector 102. In an alternative implementation, the ripple tolerance at the input 104 may be programmable. The detector also detects a reduction in the DC power level at the input 104 to generate an output signal.

If the detector 120 detects a power loss at the input 104, it generates a disable signal 122 that is communicated to the pass element (isolation circuit) 106, a charge reservoir 124, and a flag generator 126. In response to receiving the disable signal 122, the pass element 106 may isolate the host interface connector 102 from the disc drive circuit 110. The charge reservoir 124 receives the disable signal 122 as an input signal to dump current onto an output 128, which provides current to the disc drive circuit 110 for a predetermined period of time. In one implementation, the charge reservoir 124 is configured to provide up to 700 mA of current to the disc drive circuit 110 for a period of approximately 100 microseconds.

The flag generator 126 is configured to generate a flag 130 in response to receiving the disable signal 122. In one implementation, the flag 130 is used to interrupt a microprocessor 150 in the disc drive circuit 110. In response, the flag 130 may notify the microprocessor to complete all sector write operations that are being currently executed by the disc drive circuit 110. The flag generator 126 may be configured to receive an input from the detector 120 to indicate an AC ripple above a threshold AC ripple as per the specification of the host interface connector 102 as well as an input from the detector 120 to indicate a drop in DC level of the power at the host interface connector 102. The flag generator 126 uses both of such inputs to generate a flag signal 130 that is provided to the microprocessor 150 on the disc drive circuit 110.

Figure 2:
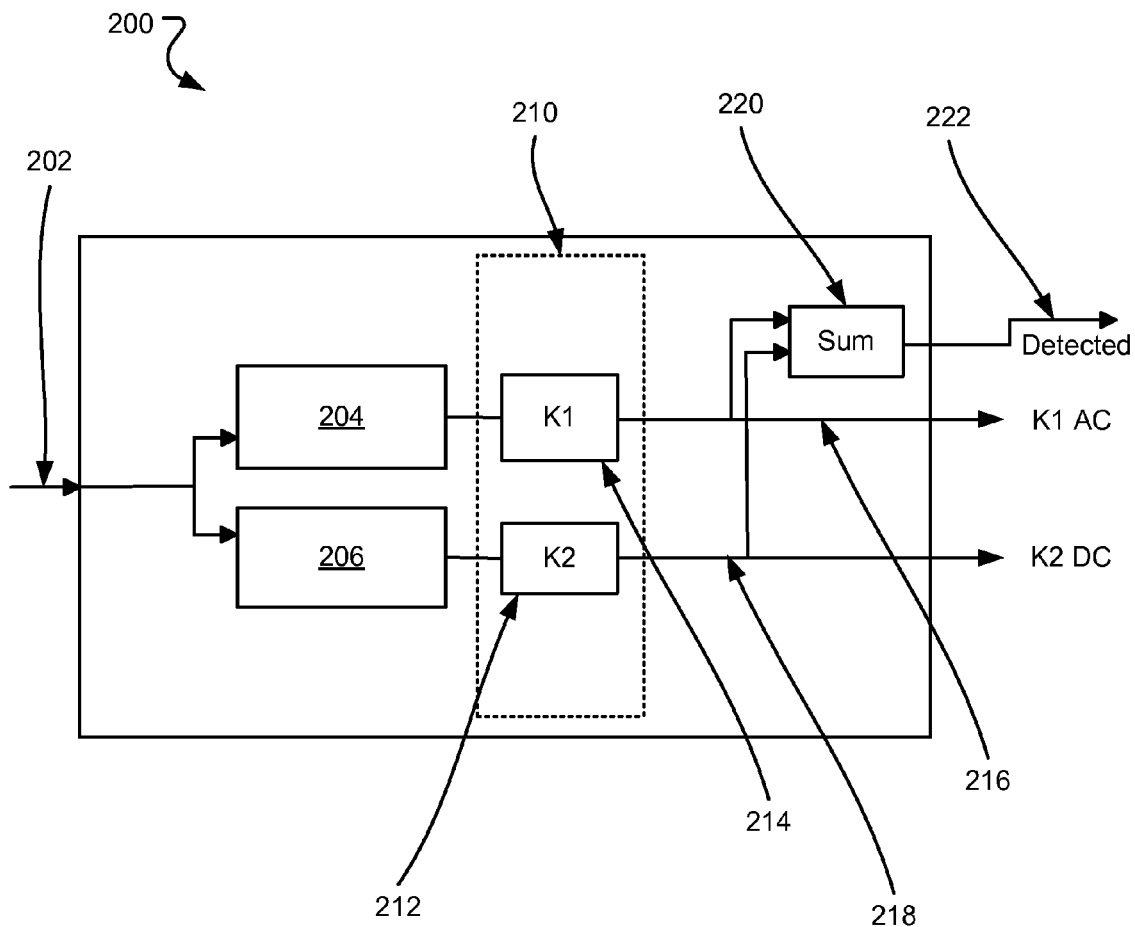
FIG. 2 illustrates example functional components of a detector component of the power loss mitigation apparatus disclosed herein.

FIG. 2 illustrates example functional components of a detector 200 of the power loss mitigation apparatus disclosed herein. The detector 200 is configured to receive an input 202 from a host interface connector (not shown). The detector 200 includes an AC component detector 204 to detect a change in AC ripple in the input. For example, the AC component detector 204 may be implemented using a transistor with the base to emitter voltage $V_{BE}$ of the transistor biased such that a small change in the AC ripple on the input turns on the transistor. A DC component detector 206 generates an output based on change in the DC level of the input 202. In one implementation, the DC component detector 206 generates an output when the input 202 drops by approximately 0.5 volts.

The outputs of the AC component detector 204 and the DC component detector 206 are input to programmable scaling and filtering units 210 that can modify the outputs of the AC component detector 204 and the DC component detector 206 to generate a modified AC output 216 and a modified DC output 218. In one implementation, the programmable scaling and filtering units 210 include resistors K1 212 and K2 214 that modify the outputs of the AC component detector 204 and the DC component detector 206 using low pass filters The modified outputs 216 and 218 are combined by a summing unit 220 to generate a detected output 222.

Figure 3:
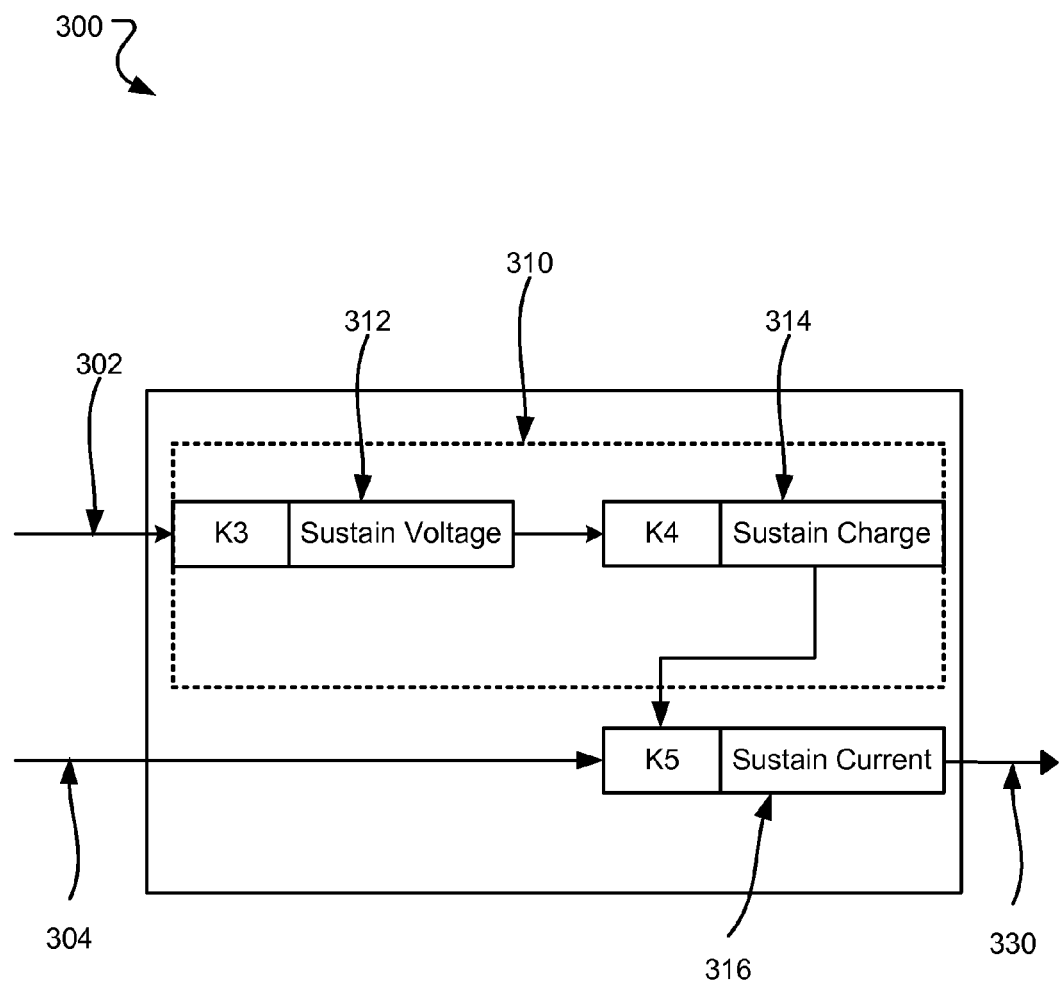
FIG. 3 illustrates example functional components of a voltage sustain component of the power loss mitigation apparatus disclosed herein.

FIG. 3 illustrates example functional components of a sustain component 300 of the power loss mitigation apparatus disclosed herein. The sustain component 300 receives a sustain input 302 that can be used to build up sustain charge for a charge reservoir 310. In one implementation, the sustain input 302 is a boost voltage. In one implementation, where the sustain component is used on a disc drive, the boost voltage may be externally generated by a host connected to a disc drive or provided by a servo chip located on the disc drive. The sustain component includes a programmable resistor K3 that can be used to control build up of a sustain voltage 312 for the charge reservoir 310 and a programmable resistor K4 that can be used to control build up of a sustain charge 314 for the charge reservoir 310. In one implementation, the charge reservoir 310 is configured to store up to 70 micro-coulombs of charge, which can generate up to 700 mA of current for a period of approximately 100 microseconds.

The sustain charge 314 may be used to provide a sustain current 316 in case of power loss. The sustain component 300 also receives a power loss detection input 304 indicating a power loss at an input terminal. For example, the power loss detection input 304 may be generated by a detection component disclosed in FIG. 2 above. In one implementation, a pair of transistors configured substantially in a Darlington pair arrangement may be used to trigger draining of the sustain charge 314 to generate the sustain current 316. The amount of the sustain current 316 may be controlled by a programmable resistor K5. The sustain component 300 generates an energy output 330 that may be used to sustain a circuit in case of power loss.

Figure 4:
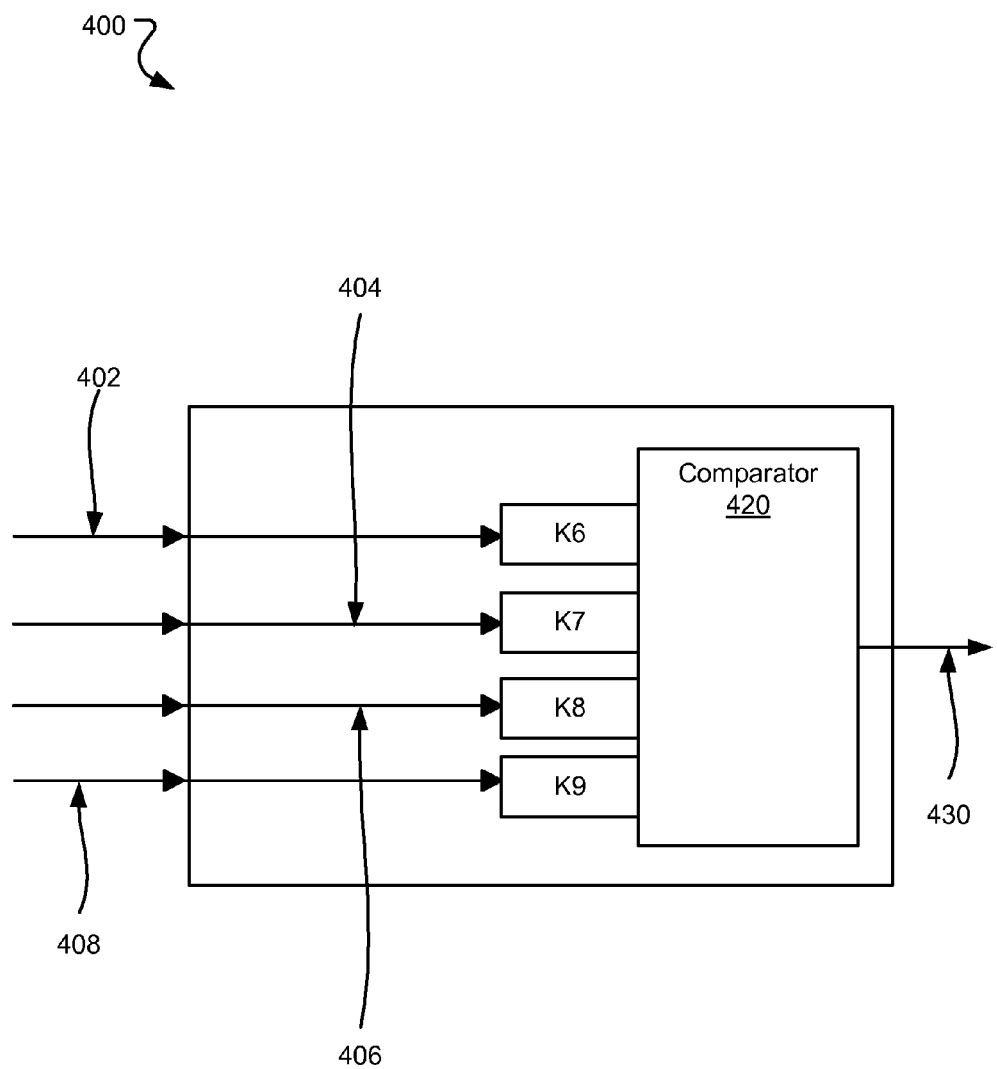
FIG. 4 illustrates example functional components of a flag generator component of the power loss mitigation apparatus disclosed herein.

FIG. 4 illustrates example functional components of a flag generator component 400 of the power loss mitigation apparatus disclosed herein. The flag generator component 400 receives a reference input 402 that can be used to compare a DC voltage level at an input terminal of the power loss mitigation apparatus. The reference input 402 may be provided to the flag generator component 400 using a low pass filter circuit. The flag generator component 400 also receives various inputs 404, 406, and 408 from the detector circuit and host interface connector. Specifically, the input 404 is an AC detector output and it indicates that the detector has tripped, the input 406 indicates a decline in DC component at the host interface connector, and the input 408 indicates a detection of AC at the host interface connector.

The inputs 402-408 are input to a comparator 420 via scaling and filtering units K6-K9. The comparator 420 generates a flag output signal 430 that can be used to notify an apparatus of a loss of power. For example, when the power loss mitigation apparatus is used in conjunction with a disc drive, the flag signal 430 indicates the status of power at an input terminal to the power loss mitigation apparatus. Thus, during normal operation, when there is no power loss, the flag signal 430 is low, indicating a normal operation for the disc drive. However, in case of loss of power at the input terminal to the power loss mitigation apparatus, the flag generator component 400 receives one or more of the inputs 404, 406, and 408 indicating a loss of power and generates a high level for the flag signal 430. In response to the flag signal 430 indicating power loss, the disc drive may initiate a number of house keeping operations, including completing any sector write operations that are being currently executed.

Figure 5:
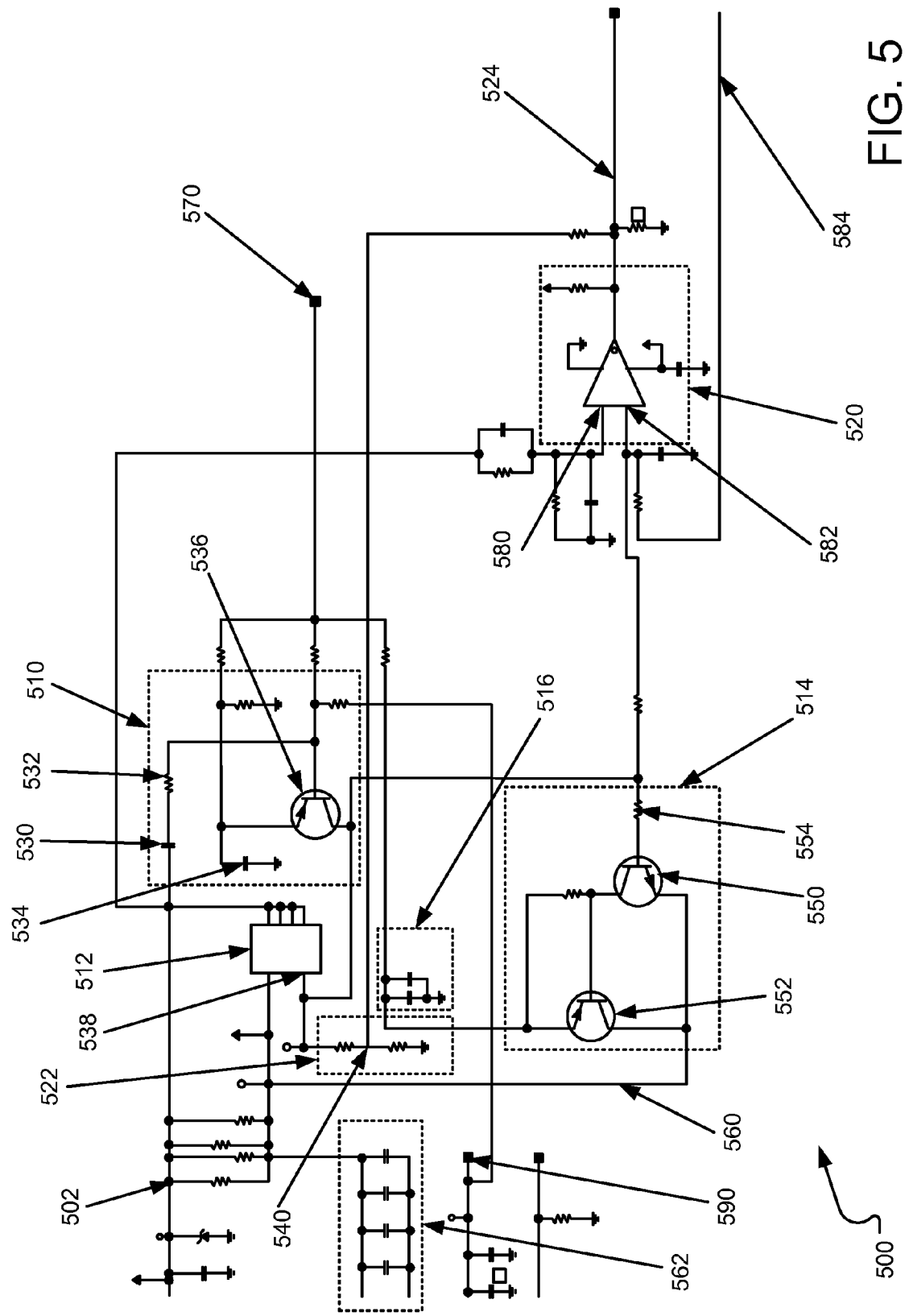
FIG. 5 illustrates an example implementation of the power loss mitigation apparatus disclosed herein.

FIG. 5 illustrates an example implementation of the power loss mitigation apparatus 500. The power loss mitigation apparatus 500 includes components to implement a pass element 512, a detection circuit 510, a sustain circuit 514, a charge reservoir circuit 516, and a flag generator circuit 520. The pass element 512 may be implemented using a pFET (positive channel field effect transistor) that requires a positive event to turn off the pass element 512. In one implementation, the pass element 512 acts as an open circuit between a circuit 560, such as a disc drive circuit, and the host interface connector 502, when there is a loss of power detected.

The flag generator circuit comprises a comparator 520 and a voltage divider 522 to generate a flag signal 524. For example the flag signal 524 may be a "clear to write" signal, which is low under normal operation. However, if a crowbar event is detected the flag signal 524 is raised and sent to a micro-processor of the disc drive SOC. In response, the micro-processor on the SOC may take one or more actions to reduce the loss of its current work in progress, such as for example, the writing of sectors on the disc drive.

The detector circuit 510 includes a capacitor 530 and a resistor 532 connected in series together with a dump circuit to drive the gate 538 of the pass element 512. The capacitor 530 and a resistor 532 connected in series forms a high pass filter that is connected between the input terminal 502 and the base of a transistor 536. The dump circuit includes a capacitor 534 and a transistor 536. When the detector circuit pulls the base of the transistor 536 to a low level, the transistor 536 dumps the charge across the capacitor 534 to the gate 538 of the pass element 512. The charge at the gate 538 of the pass element 512 turns the pass element off within a very short period of time. For example, in one implementation, the pass element 512 may be turned off within one micro second. When the charge is dumped into the gate 538 of the pass element 512, the voltage generated across the voltage divider 522 creates a logic level signal at a divider point 540 that may be fed to the microprocessor as the flag 524.

The charge reservoir circuit 516 is implemented using capacitors to store up charge that can be used by a sustain circuit 514 in case of crowbar power outage. Specifically, in one implementation the charge reservoir circuit 516 may be configured to store up to 70 micro-coulombs of charge, which allows providing 700 mA current for 100 microseconds. However, in alternative implementations, the charge reservoir circuit 516 may be configured to store other charge amounts. The charge reservoir circuit 516 stores the charge at a higher voltage, such as for example, 12 volts.

The sustain circuit 514 may be implemented using transistors 550 and 552 in a complementary Darlington pair type of configuration. A resistor 554 controls the amount of current going through the collector of the transistor 550, which in effect controls the current flowing through the base of the transistor 552. The resistor 554 may be a controllable resistor and as the resistance of the resistor 554 is changed, it controls the amount of current flowing through the collector of the transistor 550 and the base of the transistor 552. Thus, by controlling the resistance of the resistor 554, the level of current discharge from the charge reservoir circuit 516 through the sustain circuit 514 can be controlled.

Upon detection of crowbar power outage, the sustain circuit is enabled, resulting in current flowing out of the charge reservoir circuit 516 through the transistor 552 into the circuit 560. The high level of current flowing through the circuit 560 is used to charge a capacitor bank 562 that may be used to provide current for a preamplifier, a servo chip, and other components of a disc drive circuit.

At t=0, before any power is supplied to the circuit, all the transistors are off. When a host applies a+5V power at terminal 502, a body diode of the pass element 512 conducts and the +5V node at the source of the pass element 512 starts to charge. When the source element charge reaches +4.5V, it turns on and its impedance (between the drain and the source) drops to a low level of approximately ten milliohms. The low impedance at the source of the pass element 512 causes a transient increase in the current flowing through the pass element 512. The transient current spike slowly decreases when the voltage level at 502 reaches the final steady state host input voltage. The timestamp for this event will henceforth be called "t1". The power mitigation apparatus 500 also receives a boost signal VBST 570 of 12V, which may be externally generated by a host that is connected to a disc drive or provided by a servo chip located on the disc drive. At t=t1, the boost signal VBST 570 has not yet started and as a result, the voltage at the collector of the transistor 536 is at 5V, and the voltage at the base of the transistor 536 is at 4.3V, with the emitter charging to the base voltage.

Furthermore, as the transistor 536 is still turned off, the gate 538 of the pass element 512 is pulled down by the voltage divider 522 upon termination of the transient increase in the current flowing through the pass element 512. The gate 538 of the pass element 512 is directly connected to the resistor 554. Therefore, when the gate 538 is pulled low, no current flows through the resistor 554, resulting in the emitter of the transistor 552 also being pulled low. At this point, the voltage at the input VC− 580 of the comparator 520 is higher than the voltage at the input VC+ 582, resulting in the flag signal 524 being low or indicating a "clear to write" signal, signifying normal operation for the disc drive.

As the voltage VBST 570 turns on, the capacitor 534 is charged through a long time constant to a voltage substantially just under the voltage VBST, which is set to a level of 12V. As the capacitor 534 is connected to the emitter of the transistor 536, the emitter is also set to a voltage level just under 12V. On the other hand, the base of the transistor 536 is charged at a much faster time constant to a level slightly below the level of the emitter. Given the faster time constant for the voltage buildup at the base of the transistor 536 compared to the time constant for the voltage buildup at the emitter of the transistor 536, the transistor 536 does not turn on during power up. At this time, the capacitors of the charge reservoir circuit 516 builds up charge from the voltage VBST 570. For example, the capacitors of the charge reservoir circuit 516 may also build up charge of 12V. The charge built up in the charge reservoir circuit 516 may be used in the case of sudden power loss to provide current via the sustain circuit 514.

This state of the power loss mitigation apparatus 500 is a steady state where the transistor 536 of the detector circuit 510 is off. However, the base of the transistor 536 is at approximately 100 mV lower than the voltage at the emitter of the transistor 536. Furthermore, when the disc drive accesses the disc, a negative supply 590 turns on, thus the base of the transistor 536 is further biased low. As a result, the transistor 536 is in a stage where it can be readily turned on due to a substantially small change in the voltage difference between its base and emitter. Thus, a small negative transient in power at the terminal 502 may bring the voltage at the base of the transistor 536 low enough to turn it on. The amount of sensitivity in the voltage at the terminal 502 that turns on the transistor 536 may be programmable and controlled by the resistor and capacitor of the detector circuit 510. For example, in one implementation, the transistor 536 may be turned on by a negative ripple of twice the specification ripple allowed at the terminal 502. In one implementation, a negative spike of approximately 400 mV at the terminal 502 turns on the transistor 536 to trigger the detection circuit 510.

If such a negative transient occurs at the terminal 502, the transistor 536 is turned on due to reduction in the voltage at its base. This results in a pulse of current to be passed through the transistor 536 to the gate 538 of the pass element 512. This turns off the pass element 512 such that the input voltage from the terminal 502 is cut off from the output of the voltage mitigation apparatus 500. Thus, in effect the detector circuit 510 detects the negative spike at the input terminal 502 and isolates the input terminal 502 from an output of the voltage mitigation apparatus 500.

Furthermore, as a result of the high voltage at the gate 538 of the pass element 512 is also propagated to the base of the transistor 550, turning on the transistors 550 and 552. This causes the charge reservoir circuit 516 to dump its charge through the sustain circuit 514 into the circuit 560. Thus, in effect, upon detecting a negative spike at the input 502, the detector circuit 510 causes the charge reservoir circuit 516 to dump its charge through the sustain circuit 514 into the circuit 560. The high level of current flowing through the circuit 560 is used to charge a capacitor bank 562 that may be used to provide current for a preamplifier, a servo chip, and other components of a disc drive circuit. In one implementation, the charge reservoir circuit 516 has enough charge to provide current through the circuit 560 for at least 100 microseconds, which may be sufficient time for a disc drive circuit to complete various house keeping operations, such as completing all the sector write operations being currently executed, etc.

The input VC+ 582 of the comparator 520 is also connected to a reference voltage 584 and the input VC− 580 of the comparator is connected to terminal 502. As long as the voltage at the input VC− 580 is substantially greater than the voltage at the input VC+ 582, the comparator generates a flag signal 524 being low or indicating a "clear to write" signal, signifying normal operation for the disc drive. Furthermore, the input VC+ 582 is also connected to the gate 538 of the pass element 512. Therefore, a transient voltage at the gate 538, resulting from the turning on of the detector circuit 510 also increases the voltage at the input VC+ 582, resulting in the turning on of the comparator 520. Thus, the comparator 520 generates a high flag signal 524 in response to both a decrease in the DC voltage level at the terminal 502 and a negative transient (negative AC ripple) at the terminal 502. The positive value of the flag signal may indicate to a microprocessor on a disc drive to initiate house keeping operations.

Figure 6:
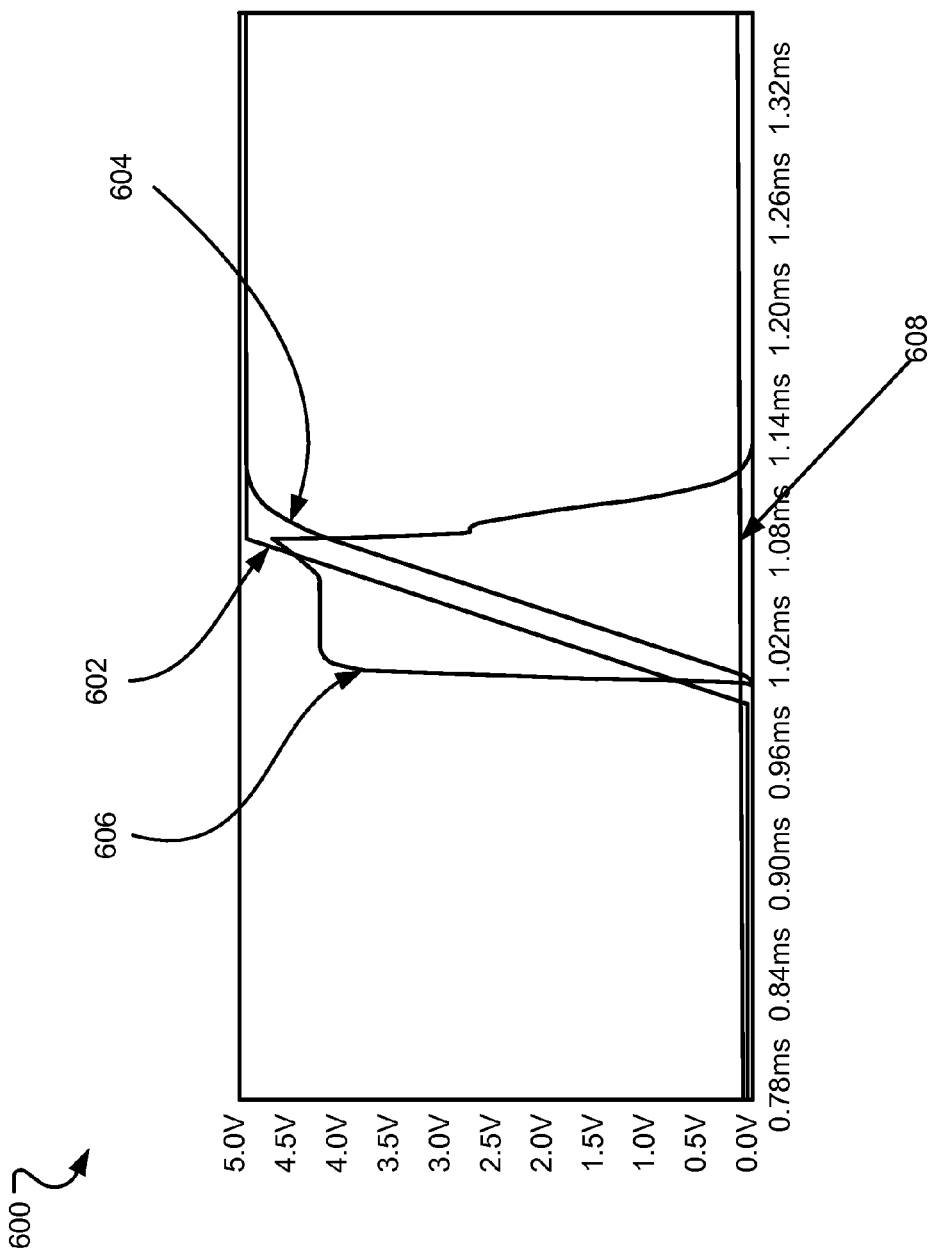
FIG. 6 illustrates an example graph of voltage levels at various points on the power loss mitigation apparatus upon supplying initial power to the power loss mitigation apparatus.

FIG. 6 illustrates an example graph 600 of voltage levels at various points on the power loss mitigation apparatus upon supplying initial power to the power loss mitigation apparatus. Specifically, an input voltage 602 illustrates the voltage at an input terminal of the power loss mitigation apparatus and an output voltage 604 illustrates an output of the power loss mitigation apparatus. As illustrated, the output voltage 604 follows the input voltage a time lag of approximately 0.02 milliseconds. A gate current 606 illustrates the current at the gate of a pass element of the power loss mitigation apparatus and a boost voltage 608 illustrates the boost voltage level for the power loss mitigation apparatus. As illustrated, the gate current 606 has a spike pattern when the input voltage 602 is turned on, however, the gate current 606 returns to zero in a short time period after the pass element acts as a zero impedance pass circuit between the input voltage and the output of the power loss mitigation apparatus. During this initiation stage, the boost voltage 608 is substantially equal to zero.

Figure 7:
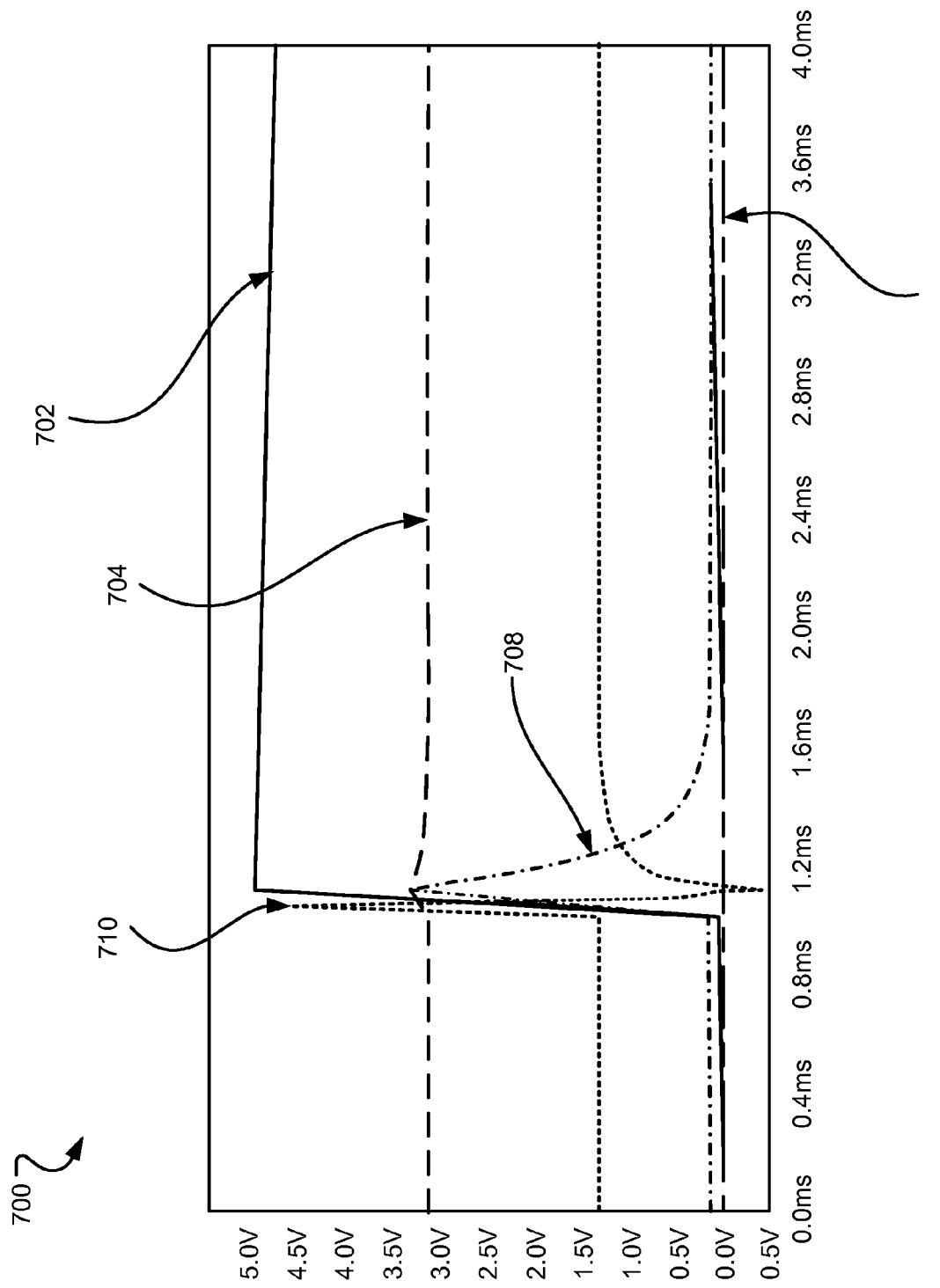
FIG. 7 illustrates an example graph of voltage and current levels at various points on the power loss mitigation apparatus after completion of the inrush transient current in the pass element for the power loss mitigation apparatus.

FIG. 7 illustrates an example graph 700 of voltage and current levels at various points on the power loss mitigation apparatus after completion of the inrush transient current in the pass element for the power loss mitigation apparatus. Specifically, comparator input voltages 702 and 704 illustrate input voltage levels at VC− and VC+ terminals of a comparator. The positive difference between the comparator voltage input levels 702 and 704 generates a low flag signal 706. A gate voltage 708 illustrates the voltage level at a gate of a pass element for the power loss mitigation apparatus and a current 710 indicates the current flowing through a base of a transistor in a sustain component of the power loss mitigation apparatus. As illustrated, at the gate voltage 708 returns back to substantially zero level after an initial transient, the current 710 at the gate of the transistor then decays back to a low level in steady state.

FIG. 8 illustrates an alternate example graph 800 of voltage and current levels at various points on the power loss mitigation apparatus disclosed herein. An input voltage 802 illustrates steady state input voltage to the power loss mitigation apparatus. The voltage levels for terminals of a transistor in the detector component of the power loss mitigation apparatus are illustrated by a base voltage 804 and an emitter voltage 806. As illustrated during steady state, the base voltage 804 is substantially equal to the emitter voltage 806. However, when a negative supply voltage 810 is turned on, it further pulls down the base voltage 804. As a result, the transistor of the detection circuit operates in a state where a small negative transition (a hair trigger) in the input voltage 802, which is reflected in the base voltage 804, may turn on the transistor.

FIG. 9 illustrates an alternate example graph 900 of voltage and current levels at various points on the power loss mitigation apparatus disclosed herein. Specifically, the graph 900 illustrates the operation of the power loss mitigation apparatus in case of a sudden power loss. When the input power 902 at an input terminal of the power loss mitigation apparatus declines from approximately 5V to 0V, the gate voltage 906 at the input gate of a pass element increases to turn off the pass element and therefore isolating the input terminal from an output of the power loss mitigation apparatus. A current 904 illustrates a reverse current in the power loss mitigation apparatus for a brief period in a reverse direction. The power loss mitigation apparatus is configured to reduce the time period for which the current 904 flows in the reverse direction to a small period.

Upon decline of the input voltage 902, the power loss mitigation apparatus causes a discharge of a charge reservoir circuit to generate discharge current at an output voltage 910 which is higher than a RESET threshold level 908 for a sufficiently long time period. For example, in one implementation, the output voltage 910 stays higher than the RESET threshold level 908 for a period 920 of approximately 100 microseconds, which may be a sufficient time period for a disc drive to complete a number of house keeping operations, including completing sector write operations, etc. Graph 900 also illustrates a flag signal 925 that is generated by a comparator component of the power loss mitigation apparatus where the flag signal 925 notifies a microprocessor of disc drive about the sudden loss of input power.

FIG. 10 illustrates an example flowchart 1000 including operations of the power loss mitigation apparatus disclosed herein. An operation 1002 provides input power to a power loss mitigation apparatus. For example, when the power loss mitigation apparatus is configured to provide power to a disc drive system, the operation 1002 may provide power to the power loss mitigation apparatus using a host computer power interface. An operation 1004 turns on a pass element of the power loss mitigation apparatus, thus connecting an output terminal of the power loss mitigation apparatus with the input terminal.

A configuring operation 1006 provides a boost power to the power loss mitigation apparatus. The boost power is used by an operation 1010 to charge a reservoir circuit and set the threshold for the detector circuit. For example, the reservoir circuit may be charged at the level of boost voltage of approximately 12V. An operation 1008 sets voltages at a base and an emitter of a detector circuit of the power loss mitigation apparatus such that the detector circuit can be turned on in response to a small transient change in the input voltage.

For example, the base to emitter voltage of the transistor may be set to be such that the transistor turns on in response to a transient change in the input voltage approximately twice the allowed ripple at the input terminal.

An operation 1012 generates a low flag signal at an output of a comparator to indicate normal operation for a disc drive or other device supported by the power loss mitigation apparatus. As a result, an operation 1014 operates such disc drive or other device in a steady state. If the input power is suddenly lost, a determining operation 1016 detects the input power loss. In one implementation, the loss of input power may be detected based on a hair trigger change in the voltage differential between a base and an emitter of a transistor in the detector circuit. Upon detecting the input power loss, an operation 1018 turns off a pass element of the power loss mitigation apparatus, thus isolating the output of the power loss mitigation apparatus from the input terminal of the power loss mitigation apparatus. An operation 1020 generates a high level on a flag signal output of a comparator circuit and an operation 1022 turns on a sustain circuit, which dumps the charge from the charge reservoir to an output circuit to sustain an output voltage above a threshold voltage for a predetermined amount of time.

FIG. 11 illustrates a plan view of the functional components of a disc drive 1100 that may use the power loss mitigation apparatus disclosed herein. The disc drive 1100 includes a base 1102 to which various components of the disc drive 1100 are mounted. A top cover 1104, shown partially cut away, cooperates with the base 1102 to form an internal, sealed environment for the disc drive in a conventional manner. The components include a spindle motor 1106 that rotates one or more storage medium discs 1108 at a constant high speed. Information is written to and read from tracks on the discs 1108 through the use of an actuator assembly 1110, which rotates during a seek operation about a bearing shaft assembly 1112 positioned adjacent the discs 1108. The actuator assembly 1110 includes a plurality of actuator arms 1114 that extend towards the discs 1108, with one or more flexures 1116 extending from each of the actuator arms 1114. Mounted at the distal end of each of the flexures 1116 is a head 1118 that includes an air bearing slider enabling the head 1118 to fly in close proximity above the corresponding surface of the associated disc 1108. The distance between the head 1118 and the storage media surface during flight is referred to as the fly height During a seek operation, the track position of the head 1118 is controlled through the use of a voice coil motor (VCM) 1124, which typically includes a coil 1126 attached to the actuator assembly 1110, as well as one or more permanent magnets 1128 which establish a magnetic field in which the coil 1126 is immersed. The controlled application of current to the coil 1126 causes magnetic interaction between the permanent magnets 1128 and the coil 1126 so that the coil 1126 moves in accordance with the well-known Lorentz relationship. As the coil 1126 moves, the actuator assembly 1110 pivots about the bearing shaft assembly 1112 and the transducer heads 1118 are caused to move across the surfaces of the discs 1108.

The spindle motor 1106 is typically de-energized when the disc drive 1100 is not in use for extended periods of time. The transducer heads 1118 are moved away from portions of the disk 1108 containing data when the drive motor is de-energized. The transducer heads 1118 are secured over portions of the disk not containing data through the use of an actuator latch arrangement and/or ramp assembly 1144, which prevents inadvertent rotation of the actuator assembly 1110 when the drive discs 1108 are not spinning A flex assembly 1130 provides the requisite electrical connection paths for the actuator assembly 1110 while allowing pivotal movement of the actuator assembly 1110 during operation. The flex assembly 1130 includes a flex cable connected with the actuator assembly 1110 and leading to the head 1118. The flex cable may be routed along the actuator arms 1114 and the flexures 1116 to the transducer heads 1118. The flex assembly 1130 typically includes circuitry for controlling the write currents applied to the transducer heads 1118 during a write operation and a preamplifier for amplifying read signals generated by the transducer heads 1118 during a read operation. The flex assembly 1130 terminates at a flex bracket 1134 for communication through the base deck 1102 to a disc drive printed circuit board 1135 (dotted line box) mounted to the bottom side of the disc drive 1100.

The disc drive 1100 may include a power loss mitigation apparatus 1150 that provides power loss mitigation operation as disclosed herein. Such power loss mitigation apparatus 1150 may be connected to host via a power interface and may generate a flag signal to the printed circuit board 1134. For example, the power loss mitigation apparatus 1150 may be configured to receive input power from a host interface connector or other source and detect a loss of power at such input to generate the flag signal to be sent to a microprocessor on the printed circuit board 1135. Furthermore, the power loss mitigation apparatus 1150 may also interface with other components of the printed circuit board 1135, such as a boost voltage generator, a reference voltage generator, etc., provided on the printed circuit board 1135.

Although the block diagrams and flowcharts disclosed herein describe various embodiments in the context of storage devices for purposes of illustration and explanation, it is to be understood that the technology disclosed herein can be more broadly used for any type of devices that are subject to sudden or rude power loss.

In one implementation, the block diagrams and flowcharts disclosed above are implemented in hardware and/or in software (including firmware, resident software, micro-code, etc.). Furthermore, various implementations may take the form of a computer program product on a computer-usable or computer-readable storage medium having computer-usable or computer-readable program code embodied in the medium for use by or in connection with an instruction execution system. Accordingly, as used herein, the term "circuit" may take the form of digital circuitry, such as processor circuitry (e.g., general-purpose microprocessor and/or digital signal processor) that executes program code, and/or analog circuitry.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   detecting a power loss to an apparatus;
   isolating the apparatus from a power supply using a pFET circuit;
   notifying the apparatus about the power loss; and
   extending operation of the apparatus for a predetermined time period using a charge reservoir.

2. The method of claim 1, wherein detecting the power loss further comprises detecting the power loss in response to a negative AC event at an input connector.

3. The method of claim 2, wherein the negative AC event is a negative transient larger than substantially twice a ripple specification at the input connector.

4. The method of claim 1, wherein notifying the apparatus further comprises notifying the apparatus to complete executing sector write operations being currently executed.

5. The method of claim 1, wherein notifying the apparatus further comprises notifying the apparatus using a flag generated based on change in an AC component in response to at least one of the power loss and a change in a DC component in response to the power loss.

6. The method of claim 5, wherein the change in the DC component in response to the power loss is detected by a comparator circuit.

7. The method of claim 1, wherein the charge reservoir is implemented using a plurality of capacitors configured to provide substantially 700 mA current for substantially 100 microseconds.

8. The method of claim 1, wherein the charge reservoir is configured to extend operation of a preamplifier of the apparatus.

9. The method of claim 1, wherein the apparatus is a disc-drive circuit.

10. A device, comprising:
    a detector configured to detect a power loss to an apparatus, wherein the detector is configured using a transistor and a high pass filter;
    an isolator circuit configured to isolate the apparatus from the power supply;
    a flag generator configured to generate a flag in response to the power loss; and
    a sustain circuit configured to sustain operation of the apparatus for a predetermined time period.

11. The device of claim 10, wherein the detector is further configured to detect power loss by detecting a negative AC ripple at an input terminal above a predetermined threshold.

12. The device of claim 11, wherein the detector is further configured to detect power loss by detecting a decline in DC voltage level below a reference voltage.

13. The device of claim 10 wherein the isolator circuit is configured using a pFET.

14. The device of claim 10 wherein the sustain circuit further comprises a charge reservoir circuit configured to generate a sustain current for the predetermined time period.

15. A storage device, comprising:
    a disc drive circuit configured to operate the storage device;
    a host interface configured to provide power to the disc drive circuit; and
    a power loss mitigation circuit configured to detect a power loss at the host interface by using a negative AC ripple in the power at the host interface, and in response to detecting the power loss, (1) isolating the disc drive circuit from the host interface, (2) notifying the disc drive circuit of the power loss, and (3) extending the operation of the disc drive circuit for a predetermined time period using a charge reservoir.

16. The storage device of claim 15 wherein the power loss mitigation circuit is further configured to detect the power loss at the host interface using a decline in the DC power at the host interface below a reference level.

17. The storage device of claim 15 wherein the power loss mitigation circuit isolates the disc drive circuit from the host interface by turning off a pFET in response to detecting the power loss at the host interface.

18. The storage device of claim 15 wherein the disc drive circuit is configured to complete a plurality of currently executing sector write operations in response to receiving notification of the power loss.

* * * * *